United States Patent [19]
Satoh

[11] Patent Number: 5,253,892
[45] Date of Patent: Oct. 19, 1993

[54] AIR BAG

[75] Inventor: Takeshi Satoh, Shiga, Japan

[73] Assignee: Takata Corporation, Tokyo, Japan

[21] Appl. No.: 977,098

[22] Filed: Nov. 16, 1992

[30] Foreign Application Priority Data

Dec. 4, 1991 [JP] Japan .................. 3-320514

[51] Int. Cl.⁵ .................. B60R 21/24; B60R 21/22
[52] U.S. Cl. .................. 280/731; 280/743
[58] Field of Search ........... 280/743, 743 A, 728, 280/729, 731

[56] References Cited

U.S. PATENT DOCUMENTS

| 3,476,402 | 11/1969 | Wilfert ............... 280/729 |
| 3,752,501 | 8/1973 | Daniel et al. ........ 280/729 |
| 4,830,401 | 5/1989 | Honda . | |

FOREIGN PATENT DOCUMENTS

| 61-11084 | 4/1986 | Japan ............... 280/743 A |
| 1-132444 | 5/1989 | Japan ............... 280/729 |
| 247242 | 10/1989 | Japan ............... 280/743 A |
| 1-311930 | 12/1989 | Japan ............... 280/729 |
| 2-169344 | 6/1990 | Japan ............... 280/743 |
| 1438032 | 7/1973 | United Kingdom . |
| 0483366A1 | 4/1991 | United Kingdom . |
| 2239433 | 7/1991 | United Kingdom . |
| 2243123 | 10/1991 | United Kingdom . |

Primary Examiner—Karin L. Tyson
Attorney, Agent, or Firm—Kanesaka and Takeuchi

[57] ABSTRACT

An air bag comprises a first annular cloth disposed on a side of the steering wheel and having an opening formed in a central portion for at least one of an inflator and an inflation gas, a second circular cloth disposed on a side of the driver and joined at a circumferential edge thereof with a circumferential edge of the first cloth, in which a diameter upon expansion is greater than a diameter of the steering wheel. A radial midway of the first cloth is connected with a radial midway of the second cloth by means of a connection piece. The connection piece has a length so that a side of the second cloth protrudes more than a central portion of the second cloth when the air bag is expanded.

8 Claims, 6 Drawing Sheets

AIR BAG

FIELD OF THE INVENTION

The present invention concerns an air bag for protecting an occupant in a driver's seat upon emergency such as collision of a vehicle.

More specifically, it relates to an air bag suitable to a case in which a steering wheel is disposed at a horizontal state as in a truck or a bus.

DESCRIPTION OF THE RELATED ART

In the air bag device of this type used generally, an air bag usually folded and attached so as to surround an inflator is covered with a cover member referred to as a module reciver which can be broken upon emergency.

When collision of a vehicle is detected by a sensor, the inflator is actuated to inflate the air bag by a gas generated from the inflator (inflation gas).

In a case of a vehicle such as a truck in which a steering wheel is disposed at a horizontal state, when the air bag is expanded upon collision of the vehicle, even if the air bag is interposed between an occupant and a steering wheel as shown in FIG. 2, the air bag 1 tends to deform in the direction escaping from the occupant 2 by the force applied from the occupant 2 to the air bag 1. Reference numeral 3 denotes a steering wheel.

OBJECT AND SUMMARY OF THE INVENTION

An object of the present invention is to provide an air bag capable of reliably protecting a driver even when a steering wheel is situated substantially horizontally.

In accordance with the first aspect of the present invention, an air bag is disposed on the side od a steering wheel and has a first annular cloth member having an opening for an inflator or introduction of an inflation gas in the central portion and a second circular cloth disposed on the side of an occupant joined at the circumferential edge to the circumferential edge of the first cloth member, the diameter upon full expansion being greater than the diameter of the steering wheel, wherein a radial midway of the first cloth member and a radial midway of the second cloth are connected by means of a connection piece and, the length of the connection piece is such that a portion protruding more than the central portion of the second cloth is formed at the outer circumferential side of the connection portion of the second cloth when the air bag is fully inflated.

In accordance with the second aspect of the present invention, the connection portion between the connection piece and the first cloth member is located near a steering wheel portion, and the connection portion between the connection piece and the second cloth is located closer to the central side than the steering wheel.

In the third aspect of the present invention, the connection piece comprises a cloth having an aperture through which the inflation gas passes.

With the air bag according to the present invention, even when the steering wheel is disposed at a horizontal state, the air bag is expanded sufficiently at the outside of the steering wheel, and the air bag is prevented from moving to either of the side as shown in FIG. 1 to be described later. Accordingly, a largely expanded air bag is present between an occupant dashing to the air bag and the steering wheel.

PREFERRED EMBODIMENTS

Description will now be made more specifically for the preferred embodiment according to the present invention with reference to the accompanying drawings.

Figure 6:
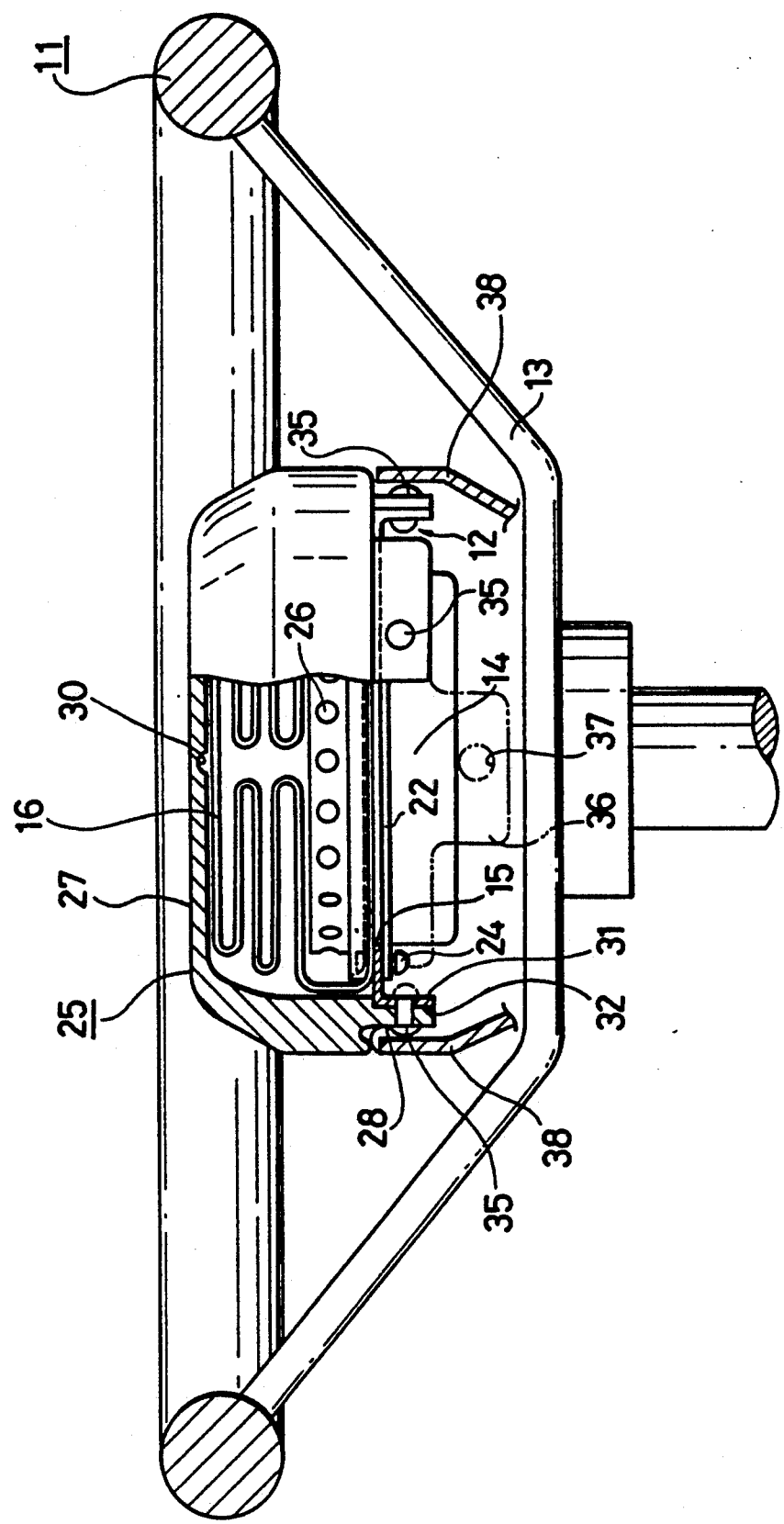
FIG. 6 is a cross sectional view of an air bag device.
Figure 7:
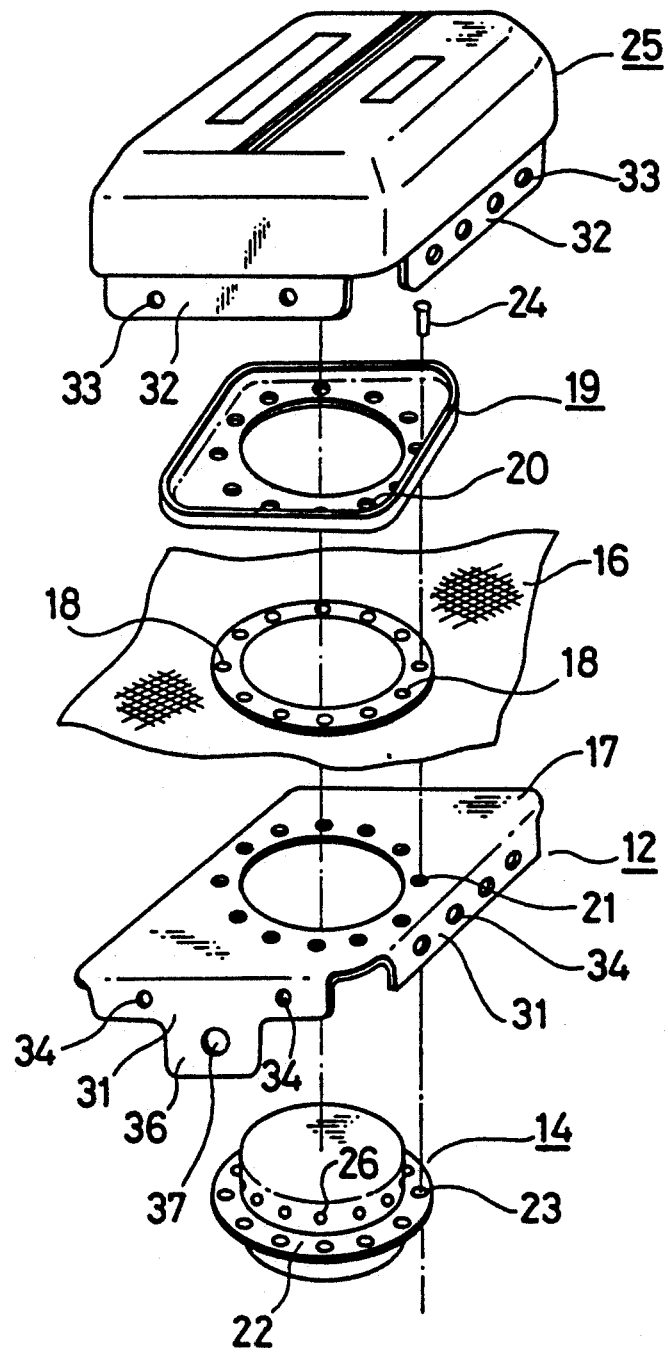
FIG. 7 is an exploded perspective view of the air bag device.

FIG. 6 is a side elevational view of an air bag device having an air bag of a preferred embodiment according to the present invention and FIG. 7 is a exploded perspective view of the air bag device.

In Figs, 6 and 7, there are shown a steering wheel 11 and spokes 13 of the steering wheel, a retainer plate 12 mounted at the base of the spokes 13 opposing to an upper half body of an occupant and an inflator 14 inserted from the rear face into a hole 15 perforated at the center of the retainer plate 12. Reference numeral 16 denotes an air bag. The air bag 16 is attached to an occupant-opposing retaining face 17 of the retainer plate 12. More specifically, the air bag 16 is secured to the retainer plate 12 by inserting rivets 24 through apertures 21 of the retainer plate 12, and apertures 23 perforated in the circumferential flange 22 of the inflator 14 and clamping the rivets 24.

The air bag 16 is folded so as to surround gas injection apertures 26 of the inflator 14. The air bag 16 is covered by a module cover 25.

An easily breakable recessed groove 30 extending in an H-shaped, radial or any other shape is formed to the inner wall surface of an occupant-opposing portion of the module cover 25, and a thin-walled portion formed by the recessed groove 30 is broken upon inflation of the air bag 16 to develop the entire module cover 25 outward in a petal-like shape.

An erected portion 31 is disposed to the retainer plate 12 be bent substantially at a right angle and in the direction parting from the occupant (hereinafter sometimes referred to as rearward). The base end 32 of the module cover 25 is appended on the side of the erected portion 31. More specifically, the module cover 25 is secured to the retainer plate 12 by passing the rivets 35 through the apertures 34 of the erected portion 31 and fastening the rivets 35.

In the drawing, a bracket 36 is extended further backward from the erected portion 31 of the retainer plate 12, and it is secured to the steering wheel by bolts (not illustrated) inserted through the apertures 37 of the bracket 36. An under cover 38 is attached so as to cover the gap formed on the side of the base end of the module cover 25.

Figure 3:
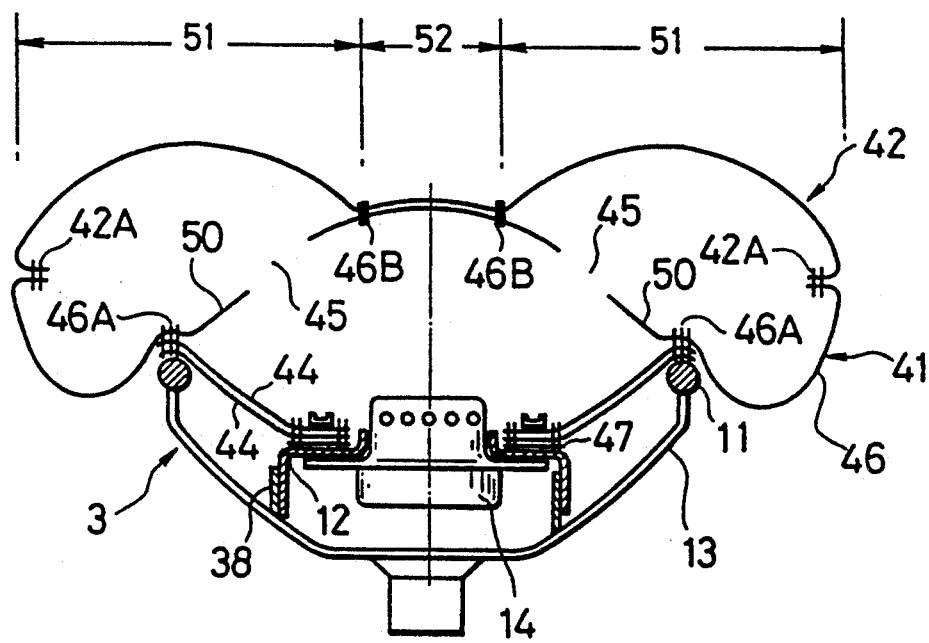
FIG. 3 is a side elevational view illustrating an expanded state of an air bag according to a preferred embodiment of the present invention.
Figure 4:
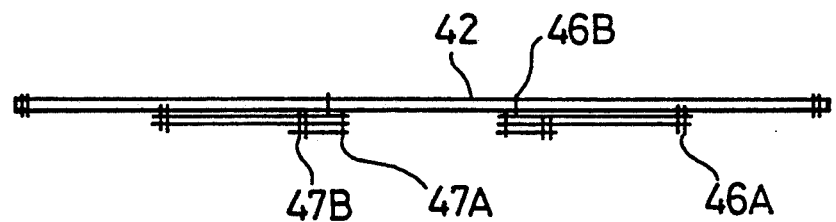
FIG. 4 is a cross sectional view in a non-expanded state of an air bag according to a preferred embodiment of the present invention.
Figure 5:
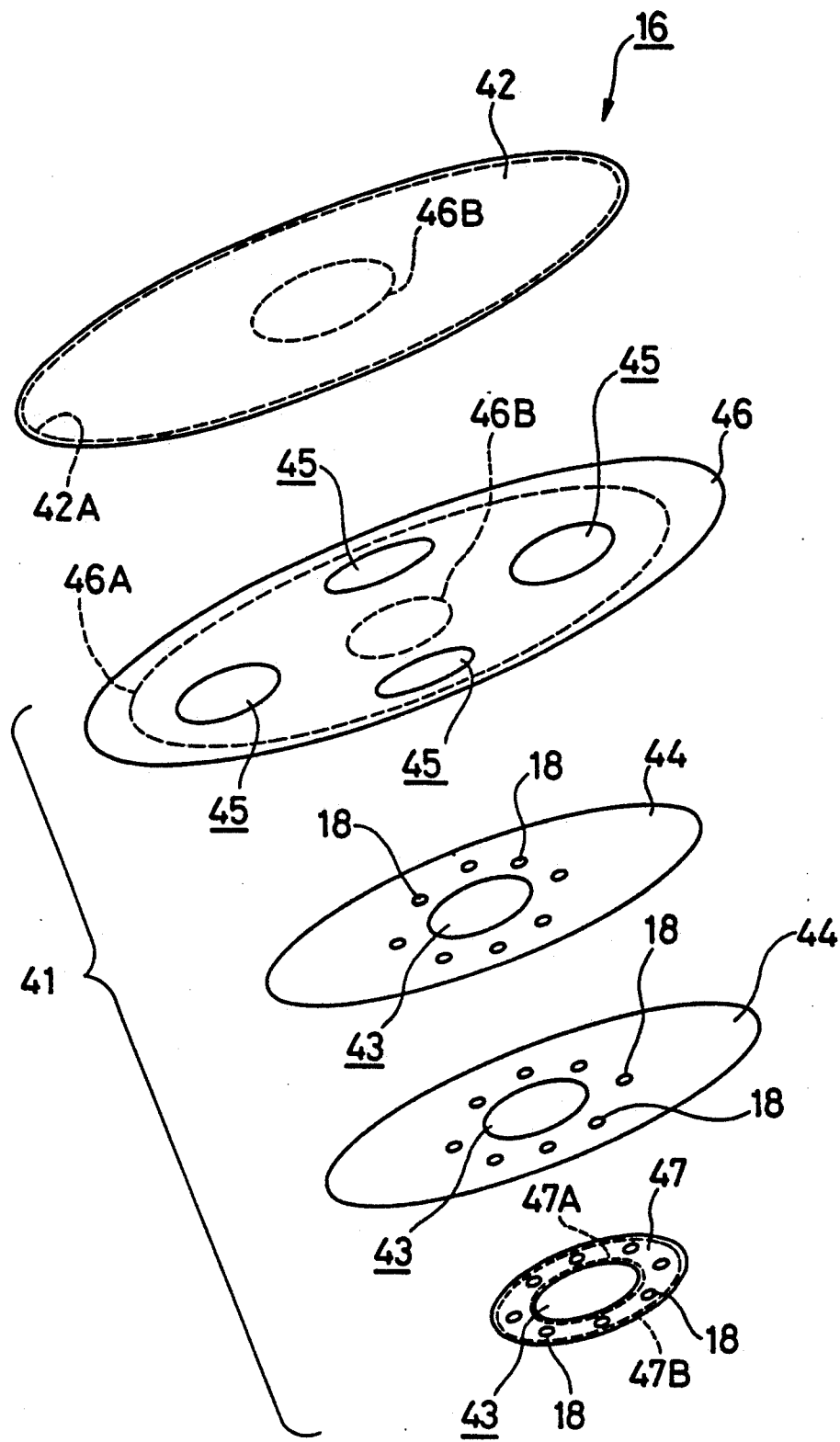
FIG. 5 is an exploded perspective view of the air bag.

As shown also in FIGS. 3 to 5, the air bag 16 mainly comprises a first cloth member 41 on the side of the steering wheel and a second cloth 42 on the side of the occupant. The second cloth 42 has a circular shape.

As clearly shown in FIG. 5, the first cloth member 41 comprises two annular support cloths 44 each of a small diameter, a circular cloth 46 having openings 45 and a patch cloth 47. The openings 45 are gas passing holes for introducing the inflation gas to the outer peripheral region in the air bag 16. The patch cloth 47 is for the reinforcement of the edge of the opening 43. The opening 43 and rivets holes 18 are formed to the patch cloth 47 and the two support cloths 44. The patch cloth 47 and the two support cloths 44 are stitched at the stitch portions 47A, 47B along the inner circumferential edge and the outer circumferential edge of the patch cloth 47.

The openings 45 in the circular cloth 46 are four in this embodiment and they are arranged at positions equally divided by four in the circumferential direction with respect to the center for the circular cloth 46. The outer circumferential edges of the two support cloths 44 are stitched with the circular cloth 46 along the stitch 46A that turns around the outer circumference of the four openings 45. The outer circumferential edge of the circular cloth 46 is stitched with the outer circumferential, edge of the second cloth 42 at the stitch 42A. The outer circumferential edges of the cloths 42 46 are stitched in a state to be located inside the airbag.

The circular cloth 46 is stitched with the second sloth 42, at a stitch 46B along the inner circumference of the four openings 45.

In the circular cloth 46, a portion between the stitches 46A and 46B functions as a connection piece 50.

Figure 1:
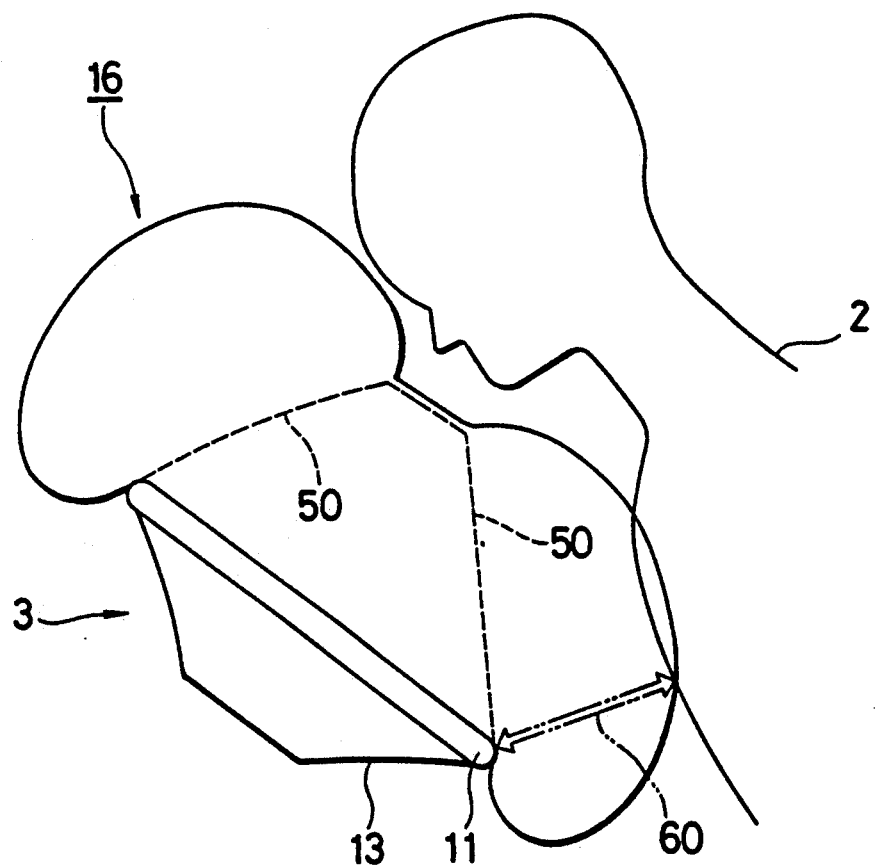
FIG. 1 is a side elevational view illustrating an expanded state of an air bag according to a preferred embodiment of the present invention.
Figure 2:
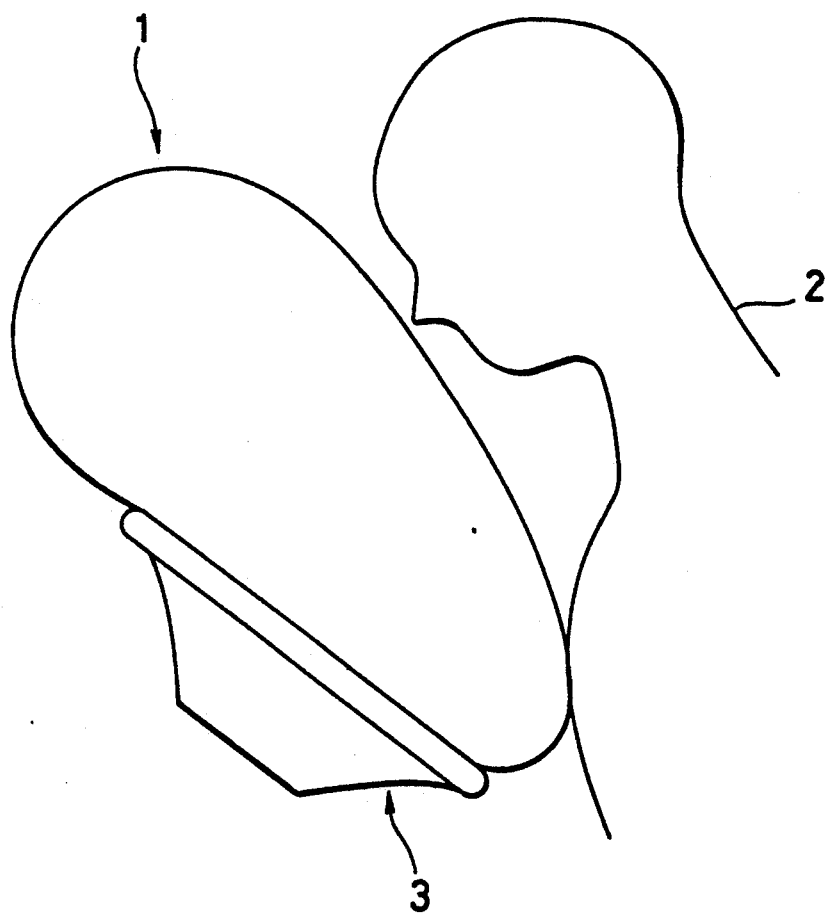
FIG. 2 is a side elevational view illustrating an expanded state of an air bag in the prior art.

In the air bag device having thus been constituted, when a vehicle collides, the inflator 14 is actuated to generate a gas. Thus, the air bag 16 starts expansion, and the module cover 25 tears along the recessed groove 30 and expands. Then, the air bag 16 inflates as shown in FIGS. 1 and 3.

In this state, an outer portion 51 of the connection piece 50 protrudes greater than the central side 52 of the air bag (region inward of the stitch 46B) to the side of the occupant 2. Further, the outer portion 51 covers the steering wheel 11 from the outer side of the steering wheel 11. In addition, the connection piece 50 inhibits the air bag 16 from escaping from a portion between the occupant 2 and the steering wheel 11. As a result, even when the occupant 2 is dashed to the air bag 16 as shown in FIG. 1, a sufficient amount of the air bag 16 is interposed also at a portion 60 between the occupant and the steering wheel 11 to sufficiently absorb impact shocks exerting on the occupant.

In the above-mentioned embodiment, although the connection piece 50 is constituted with a portion of the circular cloth 46 that constitutes a portion of the first cloth 41 member, it may be constituted with a cloth separated from the first cloth member 41.

Further, although the connection piece 50 is made of cloth in the above embodiment, it may be constituted with a belt or string. In a case of using the connection piece 50 made of cloth, the first cloth member and the second cloth can be connected uniformly in the circumferential direction of the air bag. Further, as compared with a belt or string, there is no localization of stresses.

As has been described above in the air bag according to the present invention, even in a vehicle such as a truck in which the steering wheel is disposed at to a horizontal state, an air bag can expand greatly between the steering wheel and the occupant, is interposed upon expansion of the air bag and the occupant can be protected sufficiently.

The air bag according to the present invention is free from local stress concentration.

What is claimed is:

1. An air bag for protecting a driver opposing to a steering wheel disposed approximately at a horizontal state comprising:
    a first annular cloth means disposed on a side of the steering wheel and having an opening formed in a central portion for receiving at least one of an inflator and an inflator gas,
    a second circular cloth disposed on a side of the driver and joined at a circumferential edge thereof with a circumferential edge of said first cloth means, and
    a connection piece for connecting a radial midway region of said first cloth means with a central region of said second cloth, said connection piece having a length so that a protruded portion, which protrudes to a side of the driver more than the central region of the second cloth is formed at an outer circumference of a connecting portion between said connection piece and said second cloth when the air bag is extended fully, and
    a diameter of the air bag extended fully being greater than a diameter of the steering wheel so that the protruded portion located between the driver and the steering wheel is established on and around the steering wheel.

2. An air bag as defined in claim 1, wherein said connection piece is connected with said first cloth means at a portion near the steering wheel and the connection portion between the connection piece and the second cloth is situated at an area inward of said steering wheel.

3. An air bag as defined in claim 1, wherein the connection piece is a circular cloth having an opening for allowing the inflation gas to pass therethrough.

4. An air bag to be attached to a steering wheel disposed approximately at a horizontal state, comprising:
    a second circular cloth disposed on a side of an occupant,
    a first circular cloth disposed on a side of the steering wheel, said first circular cloth being stitched at a circumferential edge thereof to a circumferential edge of the second cloth with a first stitch, and stitched to a central area of the second cloth with a second stitch around the central area of the second cloth, and
    a third circular support cloth having an opening disposed at a center of the third cloth adapted to allow an inflator to pass therethrough, and being stitched at a circumferential edge thereof to a portion between a central portion and the circumferential edge of said first cloth with a third stitch,
    said first circular cloth having openings formed between said third stitch and second second stitch for passing a gas from the inflator, and
    a diameter of the air bag upon expansion being greater than a diameter of the steering wheel.

5. An air bag as defined in claim 4, further comprising an annular patch cloth stitched to an edge portion of the opening of the third support cloth and bolt insertion apertures formed to said patch cloth and said third support cloth.

6. An air bag as defined in claim 4, wherein the third stitch is situated near the steering wheel, and a portion outside of the third stitch extends beyond an outer circumference of the steering wheel in a state where the air bag projects toward the occupant.

7. An air bag to be attached to a steering wheel disposed approximately at a horizontal state, comprising:

a first cloth disposed at a side of the steering wheel, said first cloth being larger than the steering wheel and having a circumferential edge, a central area and a plurality of openings outside the central area, a second cloth disposed at a side of an occupant and having a circumferential edge and a center portion, said second cloth being connected at the circumferential edge thereof to the circumferential edge of the first cloth and connected at the center portion thereof to the central area of the first cloth, and a third cloth disposed under the first cloth and having a circumferential edge and a central opening adapted to allow an inflator to pass therethrough, said third cloth being connected at the circumferntial edge thereof to a portion between the central area and the circumferential edge of the first cloth so that when the air bag is inflated, a gas from the inflater passes through the openings of the first cloth to thereby allow an outer portion of the second cloth to protrude closer to the occupant than the central portion.

8. An air bag as defined in claim 7, further comprising a fourth cloth laminated over the third cloth to strengthen the same.

* * * * *